(12) United States Patent
Mhaske et al.

(10) Patent No.: US 11,157,621 B1
(45) Date of Patent: Oct. 26, 2021

(54) SYSTEMS AND METHODS TO DETECT AND PREVENT AUTO-CLICK ATTACKS

(71) Applicant: Symantec Corporation, Mountain View, CA (US)

(72) Inventors: Sharad Mhaske, Maharashtra (IN); Shrikant Pawar, Mumbai (IN)

(73) Assignee: NortonLifeLock Inc., Tempe, AZ (US)

( * ) Notice: Subject to any disclaimer, the term of this patent is extended or adjusted under 35 U.S.C. 154(b) by 210 days.

(21) Appl. No.: 16/211,787

(22) Filed: Dec. 6, 2018

(51) Int. Cl.
| | |
|---|---|
| *G06F 15/16* | (2006.01) |
| *G06F 7/04* | (2006.01) |
| *H04L 29/06* | (2006.01) |
| *G06F 21/56* | (2013.01) |
| *G06F 3/0488* | (2013.01) |
| *G06F 21/55* | (2013.01) |

(52) U.S. Cl.
CPC .......... *G06F 21/566* (2013.01); *G06F 3/0488* (2013.01); *G06F 21/554* (2013.01); *G06F 2221/034* (2013.01)

(58) Field of Classification Search
CPC .... G06F 21/566; G06F 3/0488; G06F 21/554; G06F 2221/034
USPC .......................................................... 726/3
See application file for complete search history.

(56) References Cited

U.S. PATENT DOCUMENTS

| | | | | |
|---|---|---|---|---|
| 2009/0106413 | A1* | 4/2009 | Salo | G06F 21/552 709/224 |
| 2009/0125719 | A1* | 5/2009 | Cochran | G06Q 30/02 713/171 |
| 2014/0282868 | A1* | 9/2014 | Sheller | G06F 21/31 726/3 |
| 2014/0283019 | A1* | 9/2014 | Sato | G06F 3/041662 726/19 |
| 2015/0213251 | A1* | 7/2015 | Turgeman | H04L 63/08 726/7 |

FOREIGN PATENT DOCUMENTS

WO WO-2014094699 A1 * 6/2014 ......... G06F 3/04886

OTHER PUBLICATIONS

Vacha Dave; Measuring and Fingerprinting Click-Spam in Ad Networks; ACM:2012; p. 175-185.*

* cited by examiner

*Primary Examiner* — Monjur Rahim
(74) *Attorney, Agent, or Firm* — FisherBroyles, LLP (57) ABSTRACT

The disclosed computer-implemented method for detecting and preventing auto-click attacks may include (1) detecting, by the computing device, a click input, (2) detecting, by the computing device, a finger in proximity to the computing device, (3) analyzing, by the computing device, at least one event associated with the finger, (4) determining, by the computing device, that the click input is an auto-click based on the analysis of the at least one event associated with the finger, and (5) performing a security action in response to determining that the click input is an auto-click. Various other methods, systems, and computer-readable media are also disclosed.

20 Claims, 7 Drawing Sheets

SYSTEMS AND METHODS TO DETECT AND PREVENT AUTO-CLICK ATTACKS

BACKGROUND

Mobile computing devices (e.g., smartphones, tablets, etc.) are becoming increasingly vulnerable to various malicious attacks from malware. Malware attacks may originate from a variety of sources and be inserted into existing applications on a smartphone. Malware may permit attackers to bypass firewalls and increase security vulnerability. Some attackers have managed to insert code that performs malicious actions through an otherwise benign application on the smartphone. Malware authors may attempt to defeat malware safeguards by concealing the true functionality of their code. An attacker may have the application download the hostile portion of the code at a later date after installation, rely on time delays or instruct apps to wait for an external signal before launching the malicious code. Malware may monitor your keystrokes, collect credit card and banking information, passwords and other valuable information. Malware may then send the collected info back to the attackers.

One form of malware is an auto-clicker. In some cases, auto-clickers may perform a form of ad fraud. These auto-clickers continuously make connections to websites, consequently awarding attackers with revenue on a pay-per-click basis. An auto-clicker may be a type of trojan malware that remains resident in system memory and continuously or regularly attempts to connect to specific websites. This is done to inflate the visit counters for those specific pages. The purpose of such a trojan auto-clicker is to earn money for appearing to drive traffic to specific websites or to increase the ad costs of a competitor by artificially inflating the referrals that are paid for.

Malware may be downloaded when users click on an innocent-looking link on an overlay message. When unsuspecting smartphone users click on the message, it may grant dangerous permissions or administrator rights to the device. The malware may use JavaScript code to locate and click on banners from the ads infrastructure. The malware may also display a large number of ads to the user, which sometimes forces the user to click through the ads just to remove them.

The instant disclosure, therefore, identifies and addresses a need for systems and methods to detect and prevent auto-click attacks.

SUMMARY

As will be described in greater detail below, the instant disclosure describes various systems and methods to detect and prevent auto-click attacks.

In one example, a method to detect and prevent auto-click attacks may include (1) detecting, by the computing device, a click input, (2) detecting, by the computing device, a finger in proximity to the computing device, (3) analyzing, by the computing device, at least one event associated with the finger, (4) determining, by the computing device, that the click input is an auto-click based on the analysis of the at least one event associated with the finger, and (5) performing a security action in response to determining that the click input is an auto-click.

In some examples, the method may further include receiving, by the computing device, a fingerprint input, wherein the at least one event associated with the finger is the fingerprint input.

In some examples, the method may further include receiving, by the computing device, a hover input, wherein the at least one event associated with the finger is the hover input.

In some examples, analyzing, by the computing device, the at least one event associated with the finger may include analyzing a temporal parameter associated with the hover input.

In some examples, determining, by the computing device, that the click input is an auto-click based on the analysis of the at least one event associated with the finger may include determining, by the computing device, a hover input has not been detected within a threshold time period before the detected click input.

In some examples, analyzing, by the computing device, the at least one event associated with the finger may include analyzing a spatial parameter associated with the hover input.

In some examples, determining, by the computing device, that the click input is an auto-click based on the analysis of the at least one event associated with the finger may include determining, by the computing device, a hover input has not been detected within a threshold distance from the detected click input.

In some examples, the input device may include a touchscreen.

In some examples, the method may further include adding a transparent overlay on the touchscreen, wherein receiving, by the computing device, the hover input, may include receiving the hover input from the transparent overlay on the touchscreen.

In some examples, the method may further include performing a security action on the computing device may include at least one of terminating a program associated with the auto-click and providing a notification message to a user of the computing device In one embodiment, a system to detect and prevent auto-click attacks may include at least one physical processor and physical memory that includes computer-executable instructions that, when executed by the physical processor, cause the physical processor to (1) detect, by the computing device, a click input, (2) detect, by the computing device, a finger in proximity to the computing device, (3) analyze, by the computing device, at least one event associated with the finger, (4) determine, by the computing device, that the click input is an auto-click based on the analysis of the at least one event associated with the finger, and (5) perform a security action in response to determining that the click input is an auto-click.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) detect, by the computing device, a click input, (2) detect, by the computing device, a finger in proximity to the computing device, (3) analyze, by the computing device, at least one event associated with the finger, (4) determine, by the computing device, that the click input is an auto-click based on the analysis of the at least one event associated with the finger, and (5) perform a security action in response to determining that the click input is an auto-click.

Features from any of the embodiments described herein may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods to detect and prevent auto-click attacks. As will be described in greater detail below, by detecting a hover event on a touchscreen of a computing device, the methods described herein may be able to detect whether a click within an application is a legitimate click from a user of the computing device or an auto-click generated by a malicious application. The method may detect a hover event in response to detecting a finger or object in proximity to a touchscreen of the computing device. If the hover event is temporally and/or spatially associated with the click, the click may be determined to be legitimate. If the click is not associated temporally and/or spatially with a hover event, the click may be determined to be a malicious auto-click. In response to detecting an auto-click, the computing device may perform a security action.

Moreover, the systems and methods described herein may improve computing device security and network security by facilitating the detection of auto-clicks by malicious application software. Performing security actions in response to detecting auto-clicks may improve computer networks by removing data traffic associated with auto-clicks from networks associated with the computing device. Performing security actions in response to detecting auto-clicks may also improve computing devices by reducing computing resources (e.g., memory, storage, power consumption, processor loads, etc.) associated with auto-clicks.

Figure 1:
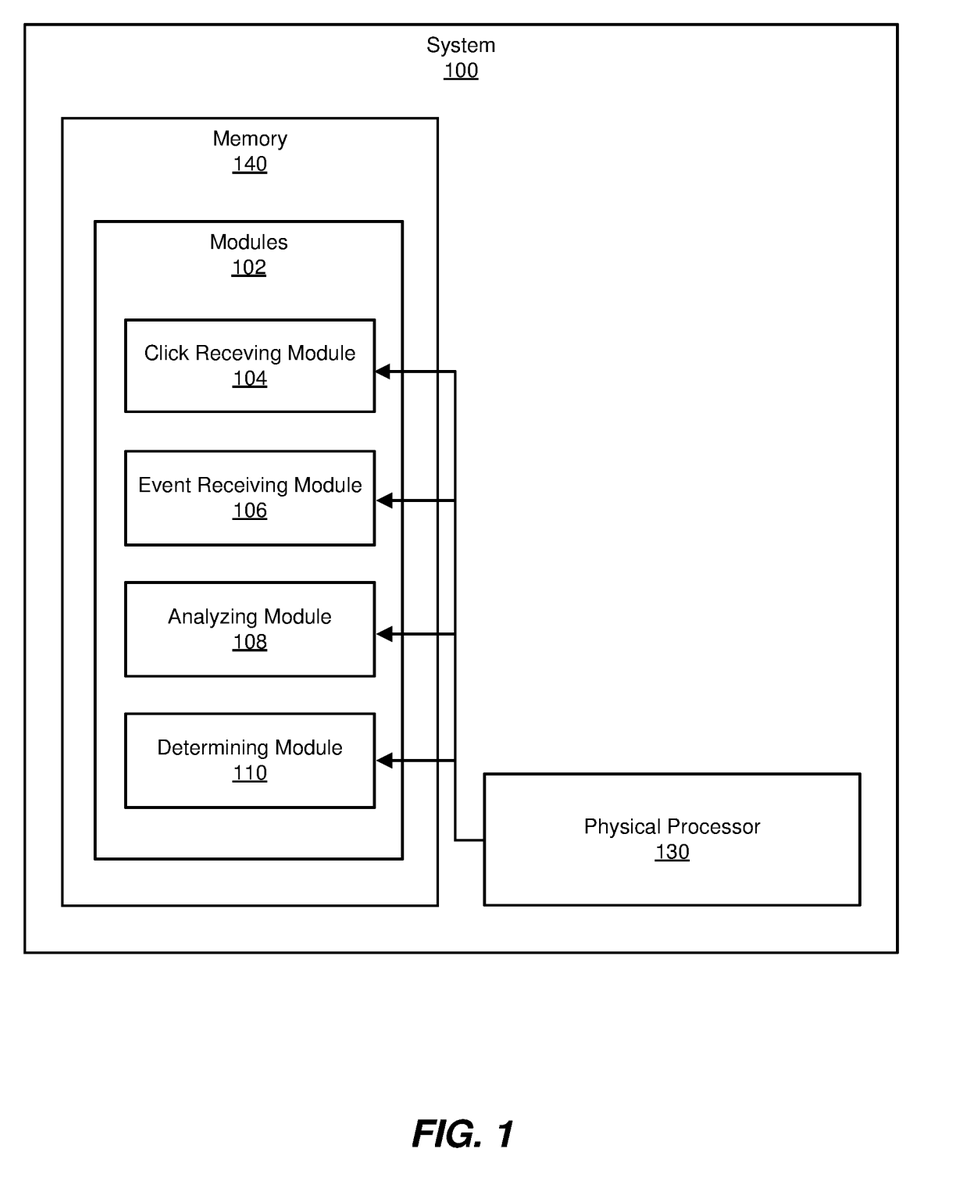
FIG. 1 is a block diagram of an example system to detect and prevent auto-click attacks.
Figure 2:
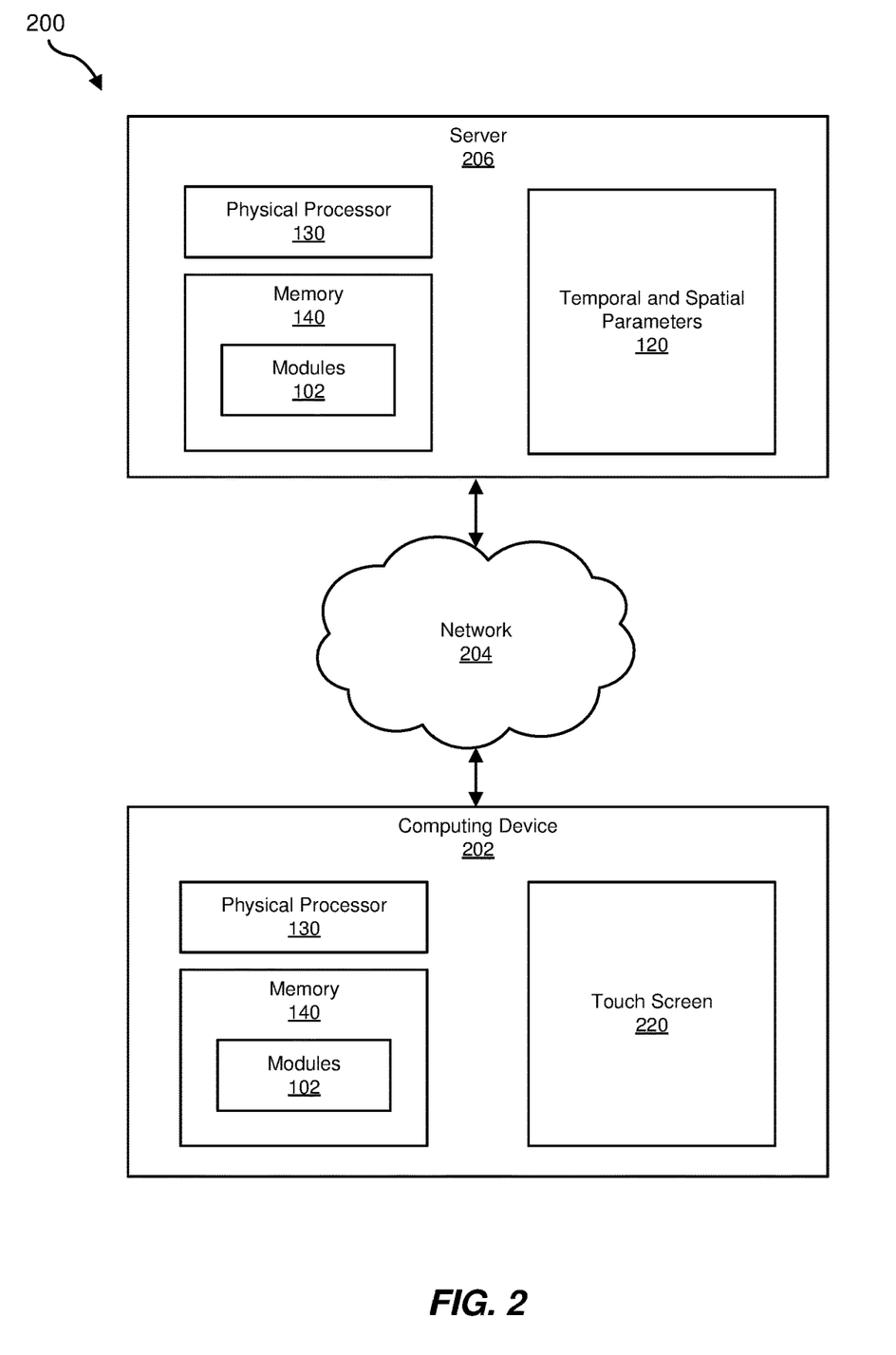
FIG. 2 is a block diagram of an additional example system to detect and prevent auto-click attacks.

The following will provide, with reference to FIGS. 1-2, detailed descriptions of example systems to detect and prevent auto-click attacks. Detailed descriptions of corresponding computer-implemented methods will also be provided in connection with FIG. 3. Detailed descriptions of systems to detect and prevent auto-click attacks will be provided in FIGS. 4 and 5. In addition, detailed descriptions of an example computing system and network architecture capable of implementing one or more of the embodiments described herein will be provided in connection with FIGS. 6 and 7, respectively.

FIG. 1 is a block diagram of an example system 100 to detect and prevent auto-click attacks. As illustrated in this figure, example system 100 may include one or more modules 102 for performing one or more tasks. As will be explained in greater detail below, modules 102 may include a click receiving module 104, an event receiving module 106, an analyzing module 108, and a determining module 110. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202 and/or server 206). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate detection and prevention of auto-clicks in Android. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with a server 206 via a network 204. In one example, all or a portion of the functionality of modules 102 may be performed by computing device 202, server 206, and/or any other suitable computing system. As will be described in greater detail below, one or more of modules 102 from FIG. 1 may, when executed by at least one processor of computing device 202 and/or server 206, enable computing device 202 and/or server 206 to detect and prevent auto-click attacks. For example, and as will be described in greater detail below, one or more of modules 102 may cause computing device 202 and/or server 206 to detect a click input, detect a finger in proximity to the computing device, analyze at least one event associated with the finger, determine that the click input is an auto-click based on the analysis of the at least one event associated with the finger and perform a security action in response to determining the click is an auto-click.

Computing device 202 generally represents any type or form of computing device capable of reading computer-executable instructions. Computing device 202 may include a smartphone running the Android operating system. Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, so-called Internet-of-Things devices (e.g., smart appliances, etc.), variations or combinations of one or more of the same, and/or any other suitable computing device.

Server 206 generally represents any type or form of computing device that is capable of detecting and preventing auto-click. Server 206 may include an application provider server. Additional examples of server 206 include, without limitation, security servers, application servers, web servers, storage servers, and/or database servers configured to run certain software applications and/or provide various security, web, storage, and/or database services. Although illustrated as a single entity in FIG. 2, server 206 may include and/or represent a plurality of servers that work and/or operate in conjunction with one another.

Network 204 generally represents any medium or architecture capable of facilitating communication or data transfer. In one example, network 204 may facilitate communication between computing device 202 and server 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Touchscreen 220 generally represents any type or form of a display screen which provides for a touch sensitive input. Examples of touchscreen 220 include, without limitation, resistive touchscreen, capacitive touchscreen, surface acoustic wave touchscreen, and infrared touchscreen.

In some examples, click receiving module 104 may receive clicks associated with requests to open URLs. The URLs may be associated with banners or advertisements. In some examples, the clicks may result from a user of computing device 202 clicking on an area of touchscreen 220 associated with the banner or advertisement. In some examples, the clicks may result from malicious code running on computing device 202 generating the clicks. The clicks generated from malicious code running on computing device 202 may be auto-clicks. In an embodiment of the present disclosure system, system 100 may differentiate auto-clicks from legitimate clicks executed by a user of computing device 202.

In some examples, event receiving module 106 may receive events including finger input events on touchscreen 220. Finger input events on touchscreen 220 may include, without limitation, a hover input, a fingerprint input, a click input and a swipe. In some examples, a hover input may be an input detected by computing device 202 when a finger and/or object is detected hovering over touchscreen 220. A hover input may be detected when a finger and/or object is positioned over, but not touching, touchscreen 220. In some examples, a hover input may be detected before a click input on touchscreen 220. As a user's finger approaches touchscreen 220 to execute a click input, a hover input may be detected when the user's finger is within a threshold distance from touchscreen 220.

In some examples, event receiving module 106 may receive a fingerprint event. A fingerprint event may be generated when computing device 202 detects a fingerprint on touchscreen 220. Computing device 202 may detect a fingerprint on touchscreen 220 when a user of computing device 202 executes a click input. By touching touchscreen 220 with a finger, touchscreen 220 may be able to detect the ridges and depressions that comprise the fingerprint. Further, computing device 202 may determine whether the fingerprint is associated with an authorized user of computing device 202.

In some examples, analyzing module 108 may analyze events received by event receiving module 106. Analyzing module 108 may analyze events received by event receiving module 106 to assist in determining whether a click event is a legitimate click from a user of computing device 220 or an auto-click generated by malicious code. Analyzing module 108 may analyze temporal parameters associated with the hover input. Analyzing module 108 may analyze a click input event to determine whether the click input was preceded by a hover input within a period of time. When a user of computing device 202 intends to click on an area of touchscreen 220, the user may approach the area of touchscreen 220 with a finger to execute the click. As the finger approaches touchscreen 220, a hover input may be detected by event receiving module 106 when the finger is within a threshold distance from touchscreen 220. Analyzing module 108 may measure a time period from when a hover input is received to when a click input is received. Determining module 110 may determine that the click is a legitimate click when the time period is less than a threshold. Determining module 110 may determine that the click is an auto-click when the click is not preceded by a hover input. Determining module 110 may determine that the click is an auto-click when the click is not preceded by a hover input within a threshold period of time. In some examples, the threshold period of time may be stored in memory 140 on computing device 202. In some examples, the threshold period of time may be stored in temporal and spatial parameters 120 on server 206.

Analyzing module 108 may analyze spatial parameters associated with the hover input. Analyzing module 108 may analyze a click input event to determine whether the click input occurred near a hover input on touchscreen 220. When a user of computing device 202 intends to click on an area of touchscreen 220, the user may approach the area of the touchscreen with a finger to execute the click. When the finger is approaching the touchscreen a hover input may be detected by event receiving module 106 when the finger is within a threshold distance from touchscreen 220. Analyzing module 108 may measure a distance from a point on touchscreen 220 where a hover input is received to a point on touchscreen 220 where a click input is received. Determining module 110 may determine that the click is a legitimate click when the measured distance is less than a threshold. Determining module 110 may determine that the click is an auto-click when the click is not preceded by a hover input. Determining module 110 may determine that the click is an auto-click when the click is not preceded by a hover input which is less than a threshold distance from the click input. In some examples, the threshold distance may be stored in memory 140 on computing device 202. In some examples, the threshold distance may be stored in temporal and spatial parameters 120 on server 206.

In some examples, a transparent overlay may be placed on touchscreen 220 to receive the hover inputs. Event receiving module 106 may receive the hover inputs from the transparent overlay. The transparent overlay may be placed on top of an application screen that is being protected from auto-click attacks. The application(s) protected from auto-click attacks may be configured by a user of computing device 202. In some examples, such as in the Android operating system, the applications protected may be determined by call functions including, without limitation, ActivityManager.RunningTaskInfo, getRunningTasks, and UsageStatsManager API.

In some examples, touchscreen 220 may include a fingerprint reader. The fingerprint reader may generate a fingerprint event when a user of computing device 202 touches touchscreen 220 and a fingerprint reading is taken. Analyzing module 108 may analyze parameters associated with the fingerprint event. Analyzing module 108 may analyze a fingerprint event to determine whether a click input occurred near a fingerprint event on touchscreen 220. When a user of computing device 202 intends to click on an area of touchscreen 220, the user may touch touchscreen 220 and a fingerprint event may occur at a point on touchscreen 220. Analyzing module 108 may measure a distance from a point on touchscreen 220 where the fingerprint event occurs to a point on touchscreen 220 where a click input is received. Determining module 110 may determine that the click is a legitimate click when the measured distance is less than a threshold. Determining module 110 may determine that the click is an auto-click when the click is not preceded by a fingerprint event. Determining module 110 may determine that the click is an auto-click when the click is not preceded by a fingerprint event which is less than a threshold distance from the click input.

In some examples, determining module 110 may determine a click is an auto-click. In response to determining a click is an auto-click, determining module 110 may perform a security action. Performing the security action on computing device 202 may include, without limitation, blocking the auto-click, terminating an action associated with the auto-click, terminating a program associated with the auto-click, and providing a notification message to a user of the computing device. In some examples, determining module 110 may determine a click is a legitimate click received from a user of computing device 202. In response to determining a click is a legitimate click, determining module 110 may perform an action associated with the legitimate click.

Figure 3:
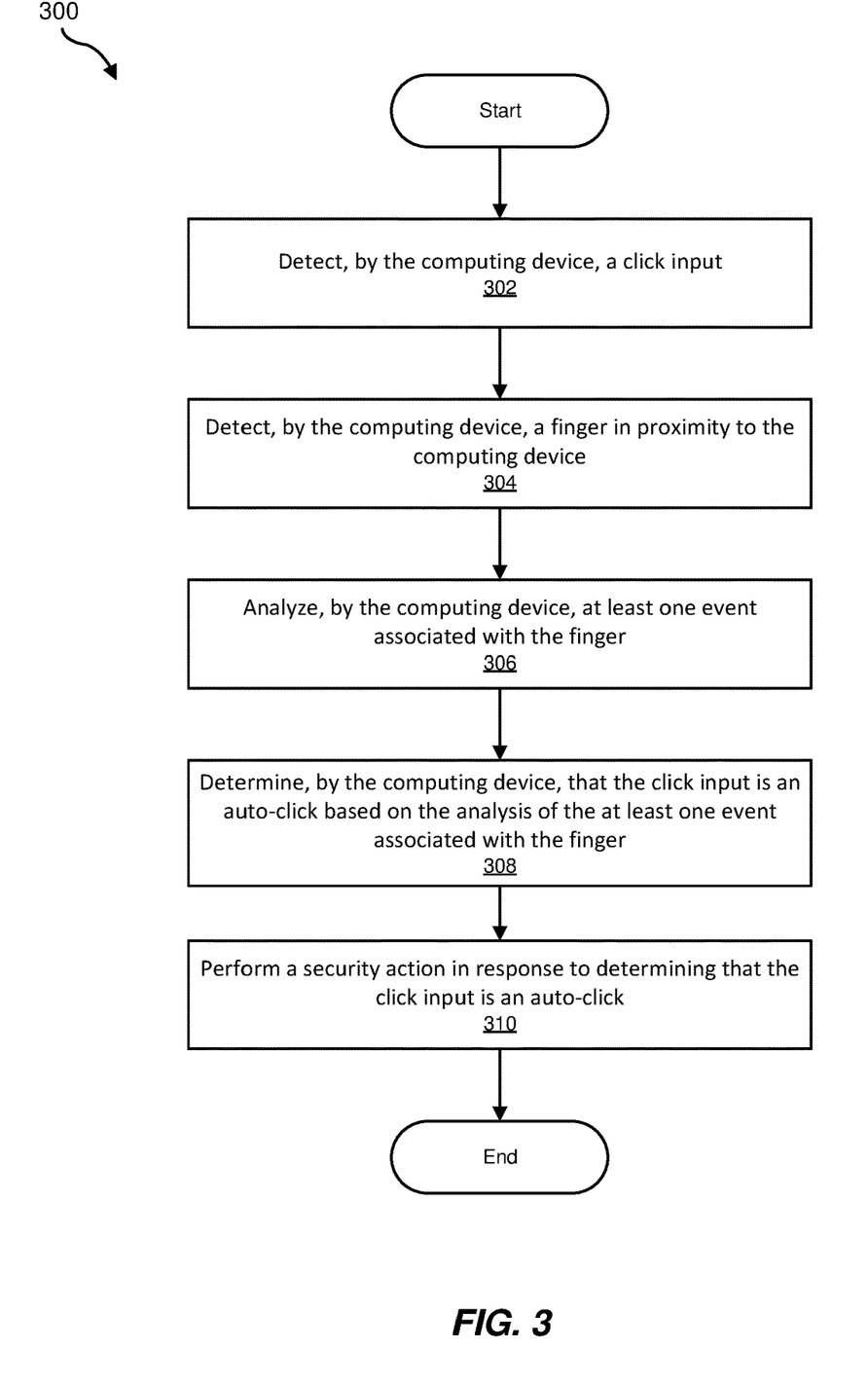
FIG. 3 is a flow diagram of an example method to detect and prevent auto-click attacks.

FIG. 3 is a flow diagram of an example computer-implemented method 300 to detect and prevent auto-click attacks. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302 one or more of the systems described herein may detect a click input. For example, click receiving module 104 may, as part of computing device 202 in FIG. 2, detect a click input. At step 304 one or more of the systems described herein may detect a finger in proximity to the computing device. For example, event receiving module 106 may, as part of computing device 202 in FIG. 2, detect a finger in proximity to computing device 202. At step 306 one or more of the systems described herein may analyze at least one event associated with the finger. For example, analyzing module 108 may, as part of computing device 202 in FIG. 2, analyze at least one event associated with the finger. At step 308 one or more of the systems described herein may determine that the click input is an auto-click based on the analysis of the at least one event associated with the finger. For example, determining module 110 may, as part of computing device 202 in FIG. 2, determine that the click input is an auto-click based on the analysis of the at least one event associated with the finger. At step 310 one or more of the systems described herein may perform a security action in response to determining that the click input is an auto-click. For example, determining module 110 may, as part of computing device 202 in FIG. 2, perform a security action in response to determining that the click input is an auto-click.

Figure 4:
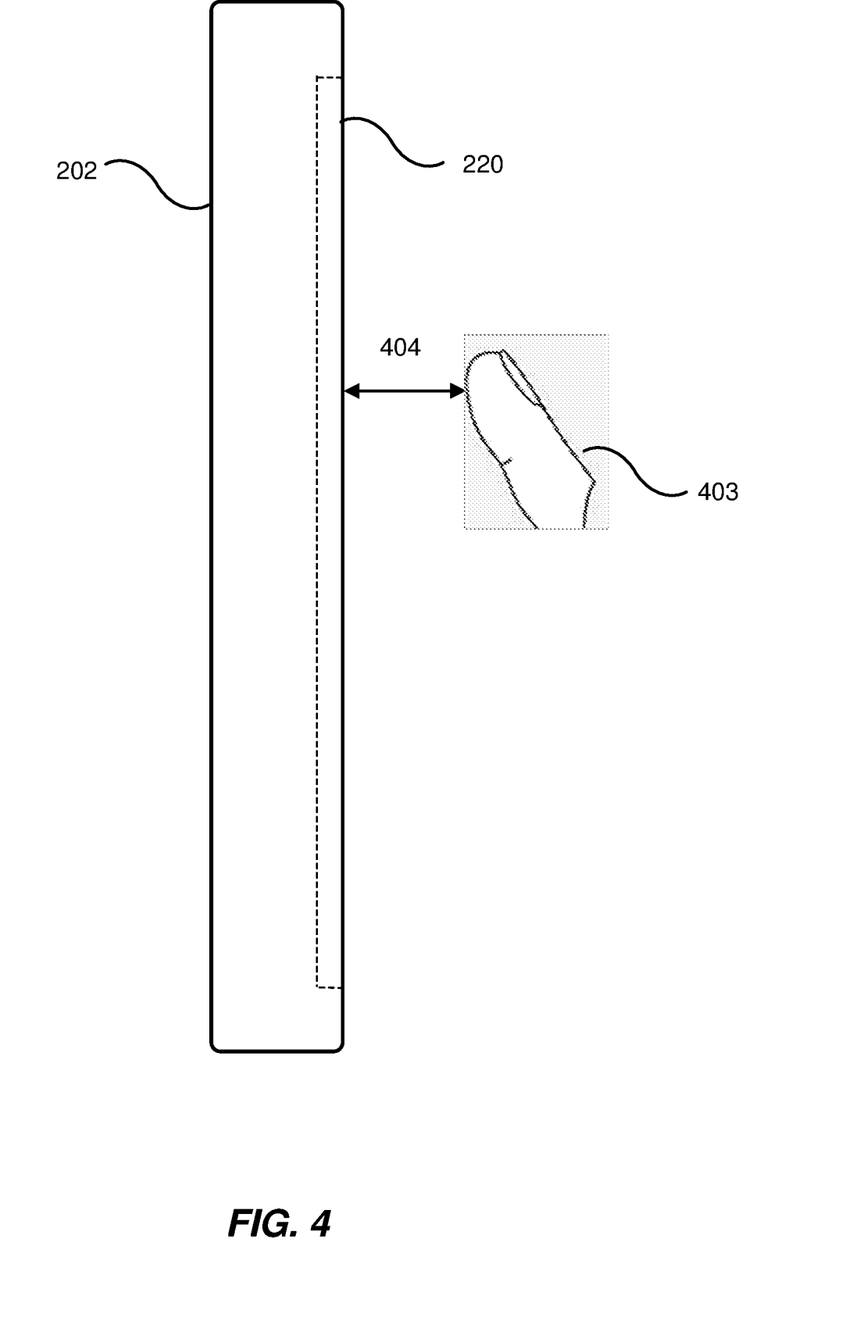
FIG. 4 is an example of a hover input on a touchscreen of a computing device.

FIG. 4 is an example of a hover input on a touchscreen of a computing device. As shown in FIG. 4, a user's finger 403 may be in proximity to touchscreen 220 of computing device 202. Finger 403 may be distance 404 away from touchscreen 220. When distance 404 is less than a threshold, touchscreen 220 detects a hover input associated with finger 403. In some examples, the hover input may be provided to event receiving module 106 in order to assist in determining whether a click input is an auto-click. As described above in detail, when a hover input is detected and is determined to be temporally and/or spatially associated with a click input, the click input may be determined to be legitimate and not an auto-click.

Figure 5:
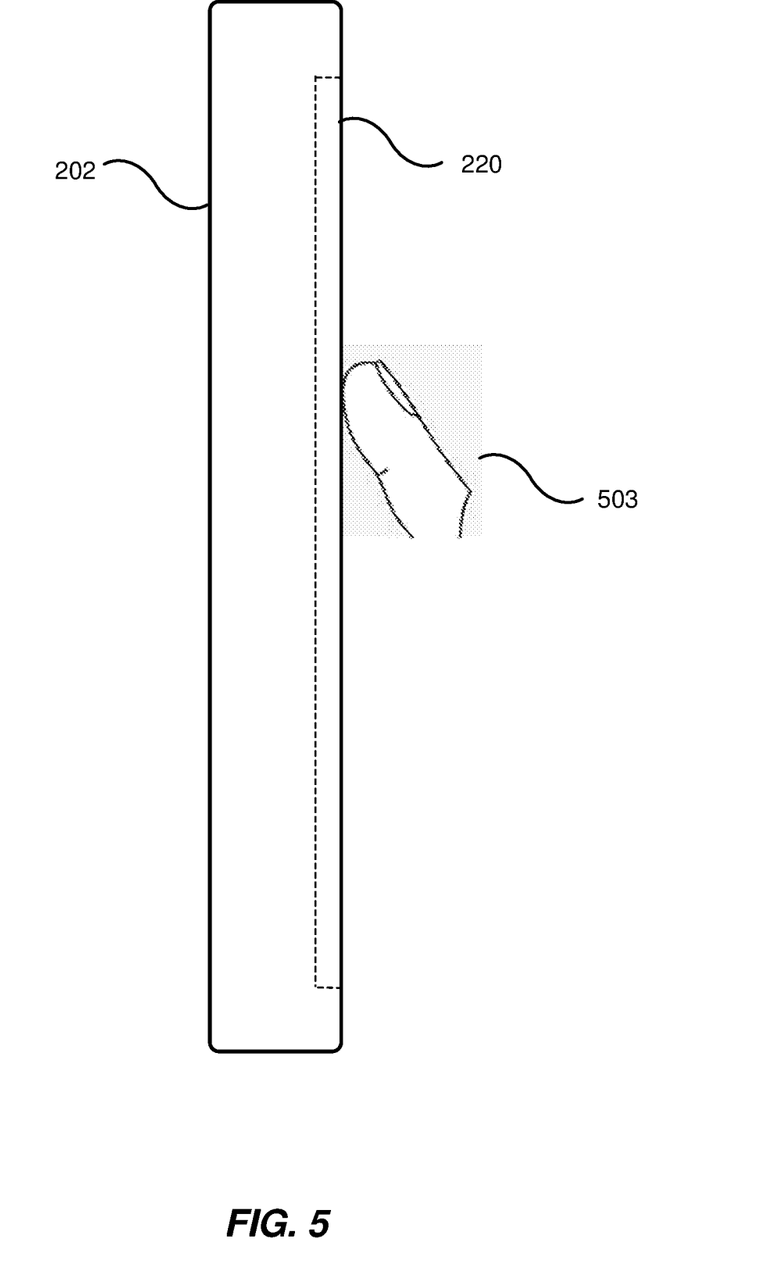
FIG. 5 is an example of a fingerprint input on a touchscreen of a computing device.

FIG. 5 is an example of a fingerprint input on a touchscreen of a computing device. As shown in FIG. 5, a user's finger 503 may be touching the surface of touchscreen 220 of computing device 202. Touchscreen 220 may detect the ridges and patterns of finger 503 and detect a fingerprint. In some examples, the fingerprint input may be provided to event receiving module 106 in order to assist in determining whether a click input is an auto-click. As described above in detail, when a fingerprint input is detected and is determined to be temporally or spatially associated with a click input, the click input may be determined to be legitimate and not an auto-click.

In some examples, malicious applications (e.g., malware) running on the Android operating system may be exploiting Android accessibility services for performing clicks without the smartphone user's knowledge (e.g., auto-clicks). These malwares may obtain accessibility service permission using various methods including, without limitation, the cloak and dagger attack and the toast overlay attack. Preventing auto-clicks using accessibility service is important for protecting smartphone users since these malwares may use accessibility services to grant the malwares dangerous permissions or force stop security applications. It is an object of the present disclosure to detect and prevent auto-clicks using touchscreen-based events to differentiate between a smartphone user's legitimate clicks and an application's malicious auto-clicks. The methods to prevent auto-clicks may be based on touchscreen hover events and/or fingerprint detection events. Hover events may be generated in response to a user hovering a finger or object over the touchscreen but not touching the surface of the touchscreen. When a user interacts with the touchscreen, the method may detect the position of a pointer (e.g., finger, stylus, etc.) without actually touching it. When the user's finger is hovering over the touchscreen within a certain distance limit (e.g., 20 mm), the Android operating system may detect the hover event. These hover events may include the x and y co-ordinates of the hovering finger on the touchscreen. The hover event may also include the timestamp each time it has been detected by the Android operating system.

In some examples, if the active application on the smartphone is from a configured list, the method may add a transparent overlay on the touchscreen. A transparent view over the entire touchscreen may be overlaid on top of the application to be protected from auto-clicks in order to detect the hover events. When the user interacts with the smartphone using the touchscreen, the transparent overlay may detect the generated hover events. If a click is performed on the smartphone without the presence of a hover event, it may be categorized as an auto-click which may be performed by the malicious application exploiting accessibility services. Using this method, the smartphone is able to differentiate between a real user's click and a malicious auto-click. In response to detecting an auto-click, the method may perform a security action.

Figure 6:
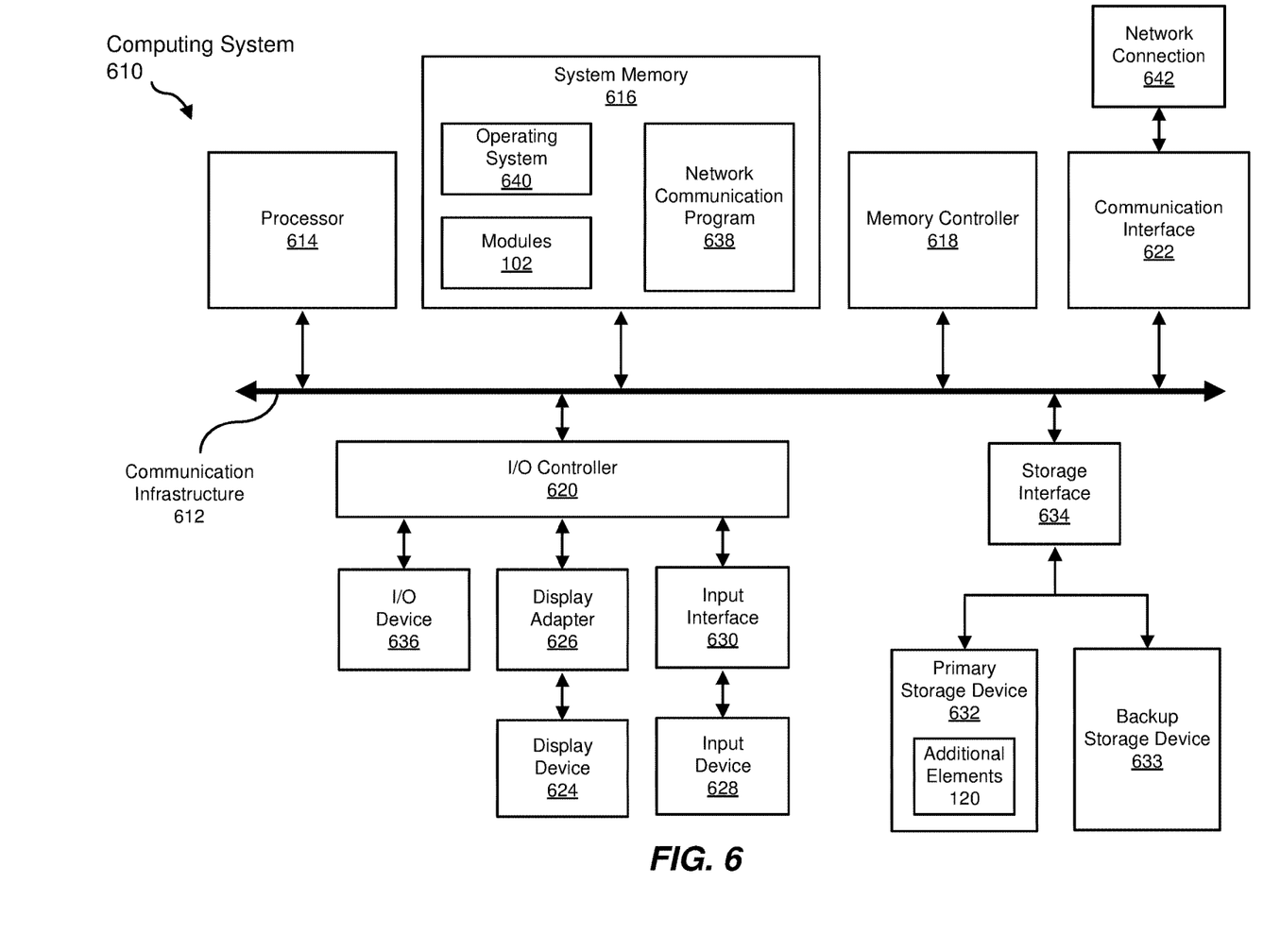
FIG. 6 is a block diagram of an example computing system capable of implementing one or more of the embodiments described and/or illustrated herein.

FIG. 6 is a block diagram of an example computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the example embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In some examples, system memory 616 may store and/or load an operating system 640 for execution by processor 614. In one example, operating system 640 may include and/or represent software that manages computer hardware and software resources and/or provides common services to computer programs and/or applications on computing system 610. Examples of operating system 640 include, without limitation, LINUX, JUNOS, MICROSOFT WINDOWS, WINDOWS MOBILE, MAC OS, APPLE'S IOS, UNIX, GOOGLE CHROME OS, GOOGLE'S ANDROID, SOLARIS, variations of one or more of the same, and/or any other suitable operating system.

In certain embodiments, example computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

As illustrated in FIG. 6, computing system 610 may also include at least one display device 624 coupled to I/O controller 620 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, example computing system 610 may also include at least one input device 628 coupled to I/O controller 620 via an input interface 630. Input device 628 generally represents any type or form of input device capable of providing input, either computer or human generated, to example computing system 610. Examples of input device 628 include, without limitation, a keyboard, a touchscreen, a pointing device, a speech recognition device, variations or combinations of one or more of the same, and/or any other input device.

Additionally or alternatively, example computing system 610 may include additional I/O devices. For example, example computing system 610 may include I/O device 636. In this example, I/O device 636 may include and/or represent a user interface that facilitates human interaction with computing system 610. Examples of I/O device 636 include, without limitation, a computer mouse, a keyboard, a monitor, a printer, a modem, a camera, a scanner, a microphone, a touchscreen device, variations or combinations of one or more of the same, and/or any other I/O device.

Communication interface 622 broadly represents any type or form of communication device or adapter capable of facilitating communication between example computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

In some examples, system memory 616 may store and/or load a network communication program 638 for execution by processor 614. In one example, network communication program 638 may include and/or represent software that enables computing system 610 to establish a network connection 642 with another computing system (not illustrated in FIG. 6) and/or communicate with the other computing system by way of communication interface 622. In this example, network communication program 638 may direct the flow of outgoing traffic that is sent to the other computing system via network connection 642. Additionally or alternatively, network communication program 638 may direct the processing of incoming traffic that is received from the other computing system via network connection 642 in connection with processor 614.

Although not illustrated in this way in FIG. 6, network communication program 638 may alternatively be stored and/or loaded in communication interface 622. For example, network communication program 638 may include and/or represent at least a portion of software and/or firmware that is executed by a processor and/or Application Specific Integrated Circuit (ASIC) incorporated in communication interface 622.

As illustrated in FIG. 6, example computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 610 may be configured as an Application Specific Integrated Circuit (ASIC) adapted to implement one or more of the example embodiments disclosed herein.

Figure 7:
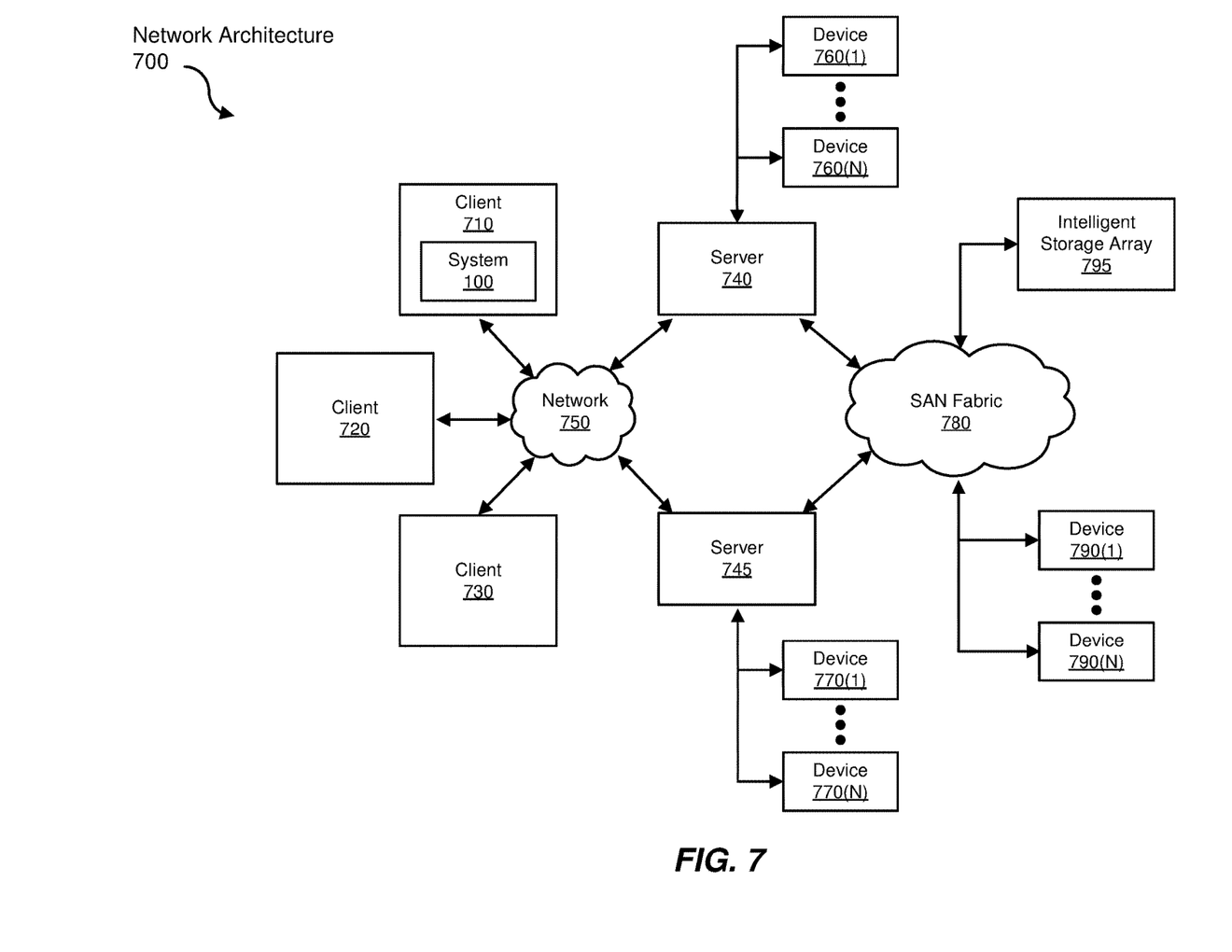
FIG. 7 is a block diagram of an example computing network capable of implementing one or more of the embodiments described and/or illustrated herein.

FIG. 7 is a block diagram of an example network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as example computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to example computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the example embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an example method to detect and prevent auto-click attacks.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for detecting and preventing auto-click attacks, at least a portion of the method being performed by a computing device comprising at least one processor, the method comprising:
    detecting, by the computing device, a finger in proximity to a screen of the computing device;
    receiving, by the computing device, a hover input representative of the finger being positioned over but not touching the screen of the computing device;

subsequent to receiving the hover input, detecting, by the computing device, a click input;
analyzing, by the computing device, the received hover input in relation to the detected click input;
determining, by the computing device, that the click input is an auto-click based on the analysis of the relationship between the received hover input and the detected click input; and
performing a security action in response to determining that the click input is an auto-click.

2. The computer-implemented method of claim 1, wherein analyzing, by the computing device, the received hover input in relation to the detected click input comprises identifying a temporal parameter associated with the hover input.

3. The computer-implemented method of claim 1, wherein determining, by the computing device, that the click input is an auto-click comprises:
determining, by the computing device, that the hover input was not received within a threshold time period before the detected click input.

4. The computer-implemented method of claim 1, wherein analyzing, by the computing device, the received hover input in relation to the detected click input comprises identifying a spatial parameter associated with the hover input.

5. The computer-implemented method of claim 1, wherein determining, by the computing device, that the click input is an auto-click comprises:
determining, by the computing device, that the hover input is representative of the finger not being positioned over the screen of the computing device within a threshold distance from the detected click input.

6. The computer-implemented method of claim 1, wherein the screen is a touchscreen.

7. The computer-implemented method of claim 6, further comprising:
adding a transparent overlay on the touchscreen, wherein receiving, by the computing device, the hover input, comprises receiving the hover input from the transparent overlay on the touchscreen.

8. The computer-implemented method of claim 1, wherein performing the security action comprises performing, on the computing device, at least one of:
a blocking of an attempted auto-click;
a terminating of a program associated with the auto-click; and
a providing of a notification message to a user of the computing device.

9. A system for detecting and preventing auto-click attacks, the system comprising:
at least one physical processor; and
physical memory comprising computer-executable instructions that, when executed by the physical processor, cause the physical processor to:
detect, by a computing device, a finger in proximity to a screen of the computing device;
receive, by the computing device, a hover input representative of the finger being positioned over but not touching the screen of the computing device;
subsequent to receiving the hover input, detect, by the computing device, a click input;
analyze, by the computing device, the received hover input in relation to the detected click input;
determine, by the computing device, that the click input is an auto-click based on the analysis of the relationship between the received hover input and the detected click input; and
perform a security action in response to determining that the click input is an auto-click.

10. The system of claim 9, wherein analyzing, by the computing device, the received hover input in relation to the detected click input comprises identifying a temporal parameter associated with the hover input.

11. The system of claim 9, wherein determining, by the computing device, that the click input is an auto-click comprises:
determining, by the computing device, that the hover input was not received within a threshold time period before the detected click input.

12. The system of claim 9, wherein analyzing, by the computing device, the received hover input in relation to the detected click input comprises identifying a spatial parameter associated with the hover input.

13. The system of claim 9, wherein determining, by the computing device, that the click input is an auto-click comprises:
determining, by the computing device, that the hover input is representative of the finger not being positioned over the screen of the computing device within a threshold distance from the detected click input.

14. The system of claim 9, wherein the screen is a touchscreen.

15. The system of claim 14, further comprising:
adding a transparent overlay on the touchscreen, wherein receiving, by the computing device, the hover input, comprises receiving the hover input from the transparent overlay on the touchscreen.

16. A non-transitory computer-readable medium comprising one or more computer-executable instructions that, when executed by at least one processor of a computing device, cause the computing device to:
detect a finger in proximity to a screen of the computing device;
receive a hover input representative of the finger being positioned over but not touching the screen of the computing device;
subsequent to receiving the hover input, detect a click input;
analyze the received hover input in relation to the detected click input;
determine that the click input is an auto-click based on the analysis of the relationship between the received hover input and the detected click input; and
perform a security action in response to determining that the click input is an auto-click.

17. The non-transitory computer-readable medium of claim 16, wherein analyzing the received hover input in relation to the detected click input comprises identifying a temporal parameter associated with the hover input.

18. The non-transitory computer-readable medium of claim 16, wherein determining that the click input is an auto-click based comprises:
determining that the hover input was not received within a threshold time period before the detected click input.

19. The non-transitory computer-readable medium of claim 16, wherein analyzing the received hover input in relation to the detected click input comprises identifying a spatial parameter associated with the hover input.

20. The non-transitory computer-readable medium of claim 16, wherein determining that the click input is an auto-click comprises:

- determining that the hover input is representative of the finger not being positioned over the screen of the computing device within a threshold distance from the detected click input.

* * * * *

UNITED STATES PATENT AND TRADEMARK OFFICE
CERTIFICATE OF CORRECTION

PATENT NO. : 11,157,621 B1  
APPLICATION NO. : 16/211787  
DATED : October 26, 2021  
INVENTOR(S) : Mhaske et al.

Page 1 of 1

It is certified that error appears in the above-identified patent and that said Letters Patent is hereby corrected as shown below:

In the Claims

In Column 18, Claim 18, Line 61, after "auto-click" delete "based", therefor.

Signed and Sealed this
Fifteenth Day of February, 2022

Drew Hirshfeld
*Performing the Functions and Duties of the*
*Under Secretary of Commerce for Intellectual Property and*
*Director of the United States Patent and Trademark Office*